United States Patent [19]

Panush

[11] Patent Number: 4,598,015

[45] Date of Patent: Jul. 1, 1986

[54] MULTILAYER SATIN FINISH AUTOMOTIVE PAINT SYSTEM

[75] Inventor: Sol Panush, Farmington Hills, Mich.

[73] Assignee: Inmont Corporation, Clifton, N.J.

[21] Appl. No.: 680,456

[22] Filed: Dec. 11, 1984

[51] Int. Cl.[4] .............................................. B32B 19/02

[52] U.S. Cl. .................................. 428/324; 427/409; 427/419.2; 428/329; 428/336; 428/404; 428/454

[58] Field of Search .............. 428/324, 329, 336, 404, 428/454; 427/409, 419.2

[56] References Cited

U.S. PATENT DOCUMENTS 4,509,988 4/1985 Bernhard .......................... 428/404

*Primary Examiner*—Marion C. McCamish

*Attorney, Agent, or Firm*—Harry J. Gwinnell; Emil Richard Skula

[57] ABSTRACT

A transparent topcoat coating composition is described comprising a thermoplastic or thermosetting resin material containing low pigment to binder ratio of titanium dioxide encapsulated mica particles. When used in a multicoat coating process as a transparent topcoat, an article is produced which not only produces satin finish color effects, but is stable to the elements as well.

7 Claims, No Drawings

MULTILAYER SATIN FINISH AUTOMOTIVE PAINT SYSTEM

TECHNICAL FIELD

The field or art to which this invention pertains is coating methods and coated articles, and particularly multiplayer coated articles.

BACKGROUND ART

In the automotive industry two significant systems are utilized in the painting of automobiles. One topcoat system which utilizes thermoplastic resins is known as the acrylic lacquer system. In this system the base polymers are the homopolymers of methyl methacrylate and copolymers of methyl methacrylate and acrylic acid, methacrylic acid, alkyl esters of acrylic acid or methacrylic acid, vinyl acetate, acrylonitrile, styrene and the like. The acrylic lacquer topcoats have been acknolwedged to have outstanding aesthetic properities. Another outstanding topcoat system used in the automotive industry is the thermosetting acrylic resins as described in U.S. Pat. No. 3,375,227, issued Mar. 26, 1968.

These topcoat systems have outstanding chemical resistance, outstanding resistance to cracking and crazing among other outstanding properties, but to the expert paint formulator, the thermosetting acrylic resins have not, in the past, quite provided the aesthetic properties obtained in the acrylic lacquer systems. In these systems a pigmented base coat composition is applied to the metal substrate to hide metallic blemishes and provide the aesthetically pleasing colors desired followed by the application of an unpigmented layer of polymer which imparts a "deep" color appeatance to the base coat and durability to this pigmented base coat. This system, however, is not without its problems. Aesthetic quality of the coating is totally dependent on the application of the base coat. The clear topcoat magnifies any weakness in this base coat including the highlighting of any color deficiencies of the base coat. The clear coat also acts as a magnifying mirror for ultraviolet radiation which can accelerate rather than retard any degradation of the base coat due to exposure to ultraviolet radiation. In addition, many of these coating systems in use today utilize metal particles in the base coat to provide an aesthetically pleasing metallic appearance. Note U.S. Pat. No. 3,639,147. However, problems have occurred with the use of metallic pigments resulting in color loss in the base coat.

In order to overcome the deficiencies of the metallic pigments, pearlescent pigments have been considered for use in the base coat, either with or in place of conventional pigments. Note commonly assigned, copending U.S. patent applications Ser. No. 440,764 filed Nov. 1, 1982 and Ser. No. 518,583 filed July 29, 1983. In order to produce novel and improved color effects iron oxide encapsulated mica particles have also been used in a transparent topcoat in a multilayer system. Note commonly assigned; copending U.S. patent application Ser. No. 526,724 filed Aug. 26, 1983, now U.S. Pat. No. 4,499,143.

Accordingly, what is needed in this art are improved coating compositions and coating systems which are aesthetically pleasing as well as durable and easy to control.

DISCLOSURE OF INVENTION

A substrate material having coated thereon a multiplayer coating system is disclosed comprising at least one base coat and at least one topcoat. The base coat is a pigmented resin. The topcoat is a transparent thermoplastic or thermosetting material containing titanium dioxide encapsulated mica particles. The titanium dioxide encapsulated mica particles are present in the thermoplastic or thermosetting layer in a pigment to binder ratio of about 0.001 to 0.32 (weight ratio). The mica particles are about 5 to about 150 microns nominal longitudinal dimension and have a thickness of about 0.25 to about one micron. The encapsulating layer constitutes about 10% to about 85% by weight of the particle weight.

Another aspect of the invention includes a method of coating a substrate by depositing a layer of the pigmented base coat and applying a layer of transparent thermoplastic or thermosetting titanium dioxide encapsulated mica containing polymer composition described above thereon.

The use of this color system pulls out and highlights the undertone qualities of the base coat pigmentation. This results in a soft, satiny, subdued lustre of base coat coloration.

The foregoing, and other features and advantages of the present invention, will become more apparent from the following description.

BEST MODE FOR CARRYING OUT THE INVENTION

While any substrate material can be coated with the coating compositions according to the present invention, including such things as glass, ceramics, asbestos, wood, and even plastic material depending on the specific drying and/or curing requirements of the particular composition, the coating system of the present invention is particularly adapted for metal substrates, and specifically as an automotive paint finish system. The substrate may also be bare substrate material or can be conventionally primed, for example to impart corrosion resistance. Exemplary metal substrates include such thins as steel, aluminum, copper, magnesium, alloys thereof, etc. The components of the composition can be varied to suit the temperature tolerance of the substrate material. For example, the components can be so constituted for air drying (i.e., ambient, low temperature cure (e.g., 150° F.–180° F.), or high temperature cure, e.g., over 180° F.).

The base coat material, i.e., the pigmented polymer layer closest to the substrate, comprises any suitable film forming material conventionally used in this art including acrylics, alkyds, polyurethanes, polyesters and aminoplast resins. The base coat can be deposited out of an aqueous carrier, or out of conventional volatile organic solvents such as aliphatic, cycloaliphatic and aromatic hydrocarbons, esters, ethers, ketones and alcohols including such things as toluene, xylene, butyl acetate, acetone, methyl isobutyl ketone, butyl alcohol, etc. When using volatile organic solvents, although it is not required, it is preferred to include from about 2% to about 50% by weight of a cellulose ester and/or wax (e.g., polyethylene) which facilitates quick release of the volatile organic solvent resulting in improved flow or leveling out of the coating. The cellulose esters used must be compatible with the particular resin systems selected and include such things as cellulose nitrate, cellulose propionate, cellulose butyrate, cellulose acetate butyrate, cellulose acetate propionate and mixtures thereof. The cellulose esters when used are preferably used in about 5% to about 20% by weight based on film forming solids.

The acrylic resins in the base coat may be either thermoplastic (acrylic lacquer systems) or thermosetting. Acrylic lacquers such as are described in U.S. Pat. No. 2,860,110 are one type of film forming composition useful according to this invention in the base coat. The acrylic lacquer compositions typically include homopolymers of methyl methacrylate and copolymers of methyl methacrylate which contain among others, acrylic acid, methacrylic acid, alkyl esters of acrylic acid, alkyl esters of methacrylic acid, vinyl acetate, acrylonitrile, styrene and the like.

When the relative viscosity of the acrylic lacquer polymer is less than about 1.05, the resulting films have poor solvent resistance, durability and mechanical properties. On the other hand, when the relative viscosity is increased above the 1.40 level, paints made from these resins are difficult to spray and have high coalescing temperatures.

Another type of film forming material useful in forming the base coat of this invention is a combination of a cross-linking agent and a carboxy-hydroxy acrylic copolymer. Monomers that can be copolymerized in the carboxy-hydroxy acrylic copolymer include esters of acrylic and methacrylic acid with alkanols containing 1 to 12 carbon atoms, such as ethyl acrylate, methyl methacrylate, butyl acrylate, butyl methacrylate, 2-ethylhexyl acrylate, lauryl methacrylate benzyl acrylate, cyclohexyl methacrylate, and the like. Additional monomers are acrylonitrile, methacrylonitrile, styrene, vinyl toluene, alpha-methyl styrene, vinyl acetate, and so forth. These monomers contain one polymerizable ethylenically unsaturated group and are devoid of hydroxyl and carboxylic groups.

The cross-linking agents used in combination with the hydroxy-carboxy copolymers are those compositions which are reactive with hydroxy and/or carboxylic acid groups. Examples of such cross-linking agents are polyisocyanates (typically di- and/or triisocyanates) polyepoxides and aminoplast resins. Particularly preferred cross-linking agents are the aminoplast resins.

The polyisocyanates when reacted with hydroxyl bearing polyester or polyether or acrylic polymers will yield urethane films useful in the process of this invention in both the base coat and topcoat. The isocyanate (—NCO) - hydroxyl (—OH) reaction takes place readily at room tempeerature, so that ambient and low temperature cure is possible.

Among other base coats which are typically used in the processes of the present invention are those commonly known as alkyd resins which are defined to include fatty acid or oil containing esterification products. The methods for preparing these resins are well known in the art.

The preferred alkyd resins useful in this invention are those containing from about 5 to about 65 weight percent of a fatty acid or oil and having an hydroxyl equivalent to carboxy equivalent ratio of from about 1.05 to 1.75. Alkyd resins having less than about 5% fatty compound are classified as the "oil-less" alkyd resins or polyester resins described hereinafter. On the other hand, alkyd resins containing greater than 65% of a fatty compound exhibit poor baking properties, poor chemical resistance and unsatisfactory adhesion to either the base coat or the substrate. When the hydroxyl to carboxyl equivalent ratio is less than about 1.05 gelation can result during polymer preparation while resins prepared having a ratio in excess of 1.75 have low molecular weights and therefore poor chemical resistance.

These alkyd resins can also be used as the topcoat of this invention. When this is the case it is preferred that the oil or fatty acid portion of the alkyd resin contain a light colored baking oil or fatty acid such as coconut or dehydrated castor oils or fatty acids. Furthermore, when these resins are used as topcoats they can be reacted with various acrylic or ethylenically unsaturated monomers as described above to produce vinyl modified alkyd resins.

Curing of these alkyd resins can be accomplished by blending with any of the previously described cross-linking agents in the same weight ratios as are used with carboxy-hydroxy copolymers.

Included among the various fatty acids and oils useful in preparing these alkyd resins are the fatty acids derived from the following oils; castor, dehydrated castor, coconut, corn, cottonseed, linseed, oticica, perilla, poppyseed, safflower, soybean, tung oil, etc. and the various rosins containing tall oil fatty acids. Useful polyols include the various glycols, such as ethylene glycol, propylene glycol, neopentyl glycol, butylene glycol, 1,4 butanediol, hexylene glycol, 1,6 hexanediol, the polyglycols such as diethylene glycol or triethylene glycol, etc.; the triols such as glycerin, trimethylol ethane, trimethylol propane, etc., and other higher functional alcohols such as pentaerythritol, sorbitol, mannitol, and the like. Acids useful in preparing the alkyd resins of this invention includ mono-functional acids such as rosin acids, benzoic acids, para tertiary butyl benzoic acid and the like; the polyfunctional acids such as adipic acid, azelaic acid, sebacic acid, phthalic acid or anhydride, isophthalic acid, terephthalic acid, dimerized and polymerized fatty acids, trimellitic acid, and the like.

Yet another useful base coat is prepared using nonaqueous dispersions such as are described in U.S. Pat. Nos. 3,050,412; 3,198,759; 3,233,903; 3,255,135. Typically these dispersions are prepared by polymerizing a monomer such as methyl methacrylate in the presence of a solvent in which polymers derived from the above monomer are insoluble and precursor which is soluble in the solvent. Nonaqueous dispersions can have a relative solution viscosity as previously defined of about 1.05 to 3.0. Dispersions having a relative solution viscosity in excess of about 3.0 are difficult to spray and have high coalescence temperatures while dispersions with a relative solution viscosity less than about 1.05 have poor resistance, durability and mechanical properties. The monomers useful in preparing the above dispersed copolymers or homopolymers are those listed previously as useful in forming the carboxy-hydroxy acrylic copolymers.

In another instance the base coat film can be produced from resins known as polyesters or "oil-less" alkyd resins. These resins are prepared by condensing nonfatty containing polyols and polyacids. Included among the useful polyacids are isophthalic acid, phthalic acid or anhydride, terephthalic acid, maleic acid or anhydride, fumaric acid, oxalic acid, sebacic acid, azelaic acid, adipic acid, etc. Mono basic acids such as benzoic, para tertiary butyl benzoic and the like can also be utilized. Among the polyalcohols are the diols or glycols such as propylene glycol, ethylene glycol, butylene glycol, 1, 4 butanediol, neopentyl glycol, hexalene glycol, 1,6-exanediol, and the like; the triols such as trimethylol ethane, trimethylol propane and glycerine and various other higher functional alcohols such as pentaerythritol.

Any of the above-recited polymers may be used as the topcoat, as long as it provides a transparent film. The term "transparent film" is defined as a film through which the base coat can be seen. It is preferred that the transparent film be substantially colorless so that the full polychromatic and aesthetic effect of the base coat is not substantially decreased. However, in some instances, desirable and unique styling effects can be obtained by the addition of contrasting or complementary colors to the topcoat. Another outstanding feature of the topcoat is the significant improvement in the durability which is provided to the overall coating composition.

The unique aesthetics of this system require the titanium dioxide encapsulated mica in the topcoat to be randomly located throughout the depth, width, and length of the clear film. In conjunction with the random distribution, the mica must also be oriented off both the vertical and horizontal axes. This distribution and orientation assures the visibility of the mica regardless of the viewing angle (90°, acute or obtuse). While this is in some degree a function of the particular coating method utilized, it is also a function of the size and constitution of the particle as described above. A Ransburg turbobell electrostatic sprayer is particulrly suitable for applications of the transparent topcoat film containing the titanium dioxide encapsulated mica of the present invention. The random orientation, uniform population distribution and lack of protrusion of the particles through the top of the transparent topcoat are all key factors which contribute to the improved properties of the transparent topcoat containing the iron oxide encapsulated mica particles.

Utilizing the compositions of the present invention offers a means of combining the desirable properties of a combination of resin systems. For example, in automotive finishes the pigment control propertities of acrylic lacquers can be combined with the chemical resistance properties of thermosetting acrylic resins by applying a thermosetting acrylic clear coat containing titanium dioxide encapsulated mica particles over a pigmented thermoplastic acrylic lacquer base coat (although acrylic lacquers may be used for both layers). Likewise, in appliance finishes the chemical resistance of polyester resins can be combined with the lower cost of thermosetting acrylic resins by applying a polyester clear topcoat containing titanium dioxide encapsulated mica particles over a pigmented thermosetting acrylic base coat. Although any of the above-mentioned thermoplastic materials may be used to form the transparent topcoat, better durability is achieved if the topcoat is one of the above-cited thermosetting materials, i.e., the material containing the cross-linking agents.

In all instances where the above methods and compositions are used extremely high gloss films result. In fact, where with normal two-coat systems a 60° gloss in excess of 90–95 is difficult to obtain, using the process of this invention gloss readings in excess of 100 are readily obtained.

The titanium dioxide encapsulated mica pigments according to the present invention are commerically available from the Mearl Corporation and EM Chemicals (not, e.g. U.S. Pat. No. 4,456,486, the disclosure of which is incorporated by reference). For additional exterior durability (e.g., exposure to the sun) thin layers of other additives such as chromium hydroxide can be coated on the titanium dioxide encapsulation layer. It should also be noted that other high temperature stable metal oxides (such as iron, aluminum, tin, copper, calcium, cadmium, cobalt, barium, strontium, manganese, magnesium and lithium) can be present on the mica prior to application of the titanium dioxide layer. The titanium dioxide encapsulation layer is generally in the molecular range of thicknesses representing about 10% to about 85% by weight of the total weight of the encapsulated mica particle, preferably about 20% to about 60%, and typically about 29% to about 48% by weight. If additives such as chromium hydroxide are used as part of the encapsulation layer they are generally present in an amount of about 1% to about 35% by weight, and typically about 0.1% to about 3.5% by weight for the chromiun hydroxide, based on total weight of the encapsulated particle.

The uniformity of shape (platelet) and smoothness of the titanium dioxide encapsulated mica pigment according the the present invention (e.g., as compared to the highly fragile, three dimensional and complicated configuration of aluminum flake, a standard in the automotive paint industry) eliminates the problem of color drift due to the shear forces (yielding fragmentation problems) in the handling (overhead pumping facilities) and application problems of ghosting, mottling, silkiness and repair color matching.

The titanium dioxode encapsulated mica produce unique aesthetic effects totally different from, for example effects produced by iron oxide encapsulated mica. Where iron oxide encapsulated mica particles in the transparent topcoat produce additive color effecting the primary color of the base coat, the titanium dioxide encapsulated mica produces a subtractive color drawing from the undertone color as well as the primary color of the base coat. For example, over a jet black base coat where iron oxide encapsulated mica adds a lustrous opalescence to the base coat, the titanium dioxide encapsulated mica in the transparent topcoat over the same jet black base coat lightens the base coat color producing a myriad of color reflections.

The titanium dioxide encapsulated mica pigments are carefully screened and controlled particles, all within about 5 microns to about 150 microns in their largest dimension, and about 0.25 micron to about 1.0 micron in thickness. The closely controlled particle size provides the transparent, translucent, reflective and refractive features establishing improved aesthetic and physical properties of these coatings through careful selection and blending of these pigments. Two particle size ranges will produce the unique aesthetic color effects described according to the present invention. The first range of particle sizes are those where substantially all of the particles are in the range of about 5 microns to about 150 microns in their largest dimension (preferably about 5 microns to about 75 microns). The second are those where substantially all of the particles are in the range of about 5 microns to about 75 microns (preferably about 5 microns to about 40 microns) in their largest dimension. Although the described aesthetic effects will be produced regardless of which particle size range is selected, the second particle size range produces a softer, more subdued color effect that the first particle size range. Regardless of the selection, the final (clear coated) enamel will have improved color durability, greater moisture resistance and greater acid resistance than coatings prepared with conventional metals of synthetic pearls.

The amount of pigment in the base coat generally comprises about 1% to about 20% by weight, preferably about 7.5% to about 15% and typically about 10% by weight.

Both the base coat and the topcoat can be applied by any conventional method in this art such as brushing, spraying, dipping, flow coating, etc. Typically spray application is used, especially for automotive finishing. Various types of spraying can be utilized such as compressed air spraying, electrostatic spraying, hot spraying techniques, airless spraying techniques etc. These can also be done by hand or by machine.

Prior to application of the coating materials of the present invention a conventional corrosion resistant primer has already been applied. To this primed substrate is applied the base coat. The base coat is typically applied from about 0.4 mil to about 2.0 mils and preferably about 0.5 mil to about 0.8 mil. This thickness can be applied in a single coating pass or a plurality of passes with very brief drying ("flash") between applications of coats.

Once the base coat has been applied the transparent overcoat containing the titanium dioxide encapsulated mica particles is applied after allowing the base coat to flash at ambient temperature for about 30 seconds to about 10 minutes, preferably about 1 to about 3 minutes. While the base coat can be dried for longer periods of time, even at higher temperatures, a much improved product is produced by application of the transparent topcoat containing the titanium dioxide encapsulated mica particles after only a brief flash. Some drying out of the base coat is necessary to prevent total mixing of the base coat and topcoat. However, a minimal degree of base coat-topcoat interaction is desirable for improved bonding of the coatings. The topcoat is applied thicker than the base coat (preferably about 1.8 to 2.3 mils) and can also be applied in a single or multiple pass.

Pigment control is retained in the base coat while it is being overcoated. This is evidenced by lack of "strike-in" or migration of the two films (the base coat and topcoat) into each other. When "strike-in" occurs, pigments move from the base coat into the topcoat, the film compositions become intermixed at the interface and the baked coating composition has a dusty appearance rather than a clear "depth" appearance. By this invention substantially no "strike-in" occurs, and the coatings have outstanding clarity and depth. However, sufficient wetting takes place at the interface so that no problems of delamination and solvent release from either coating are obtained.

Once the topcoat is applied the system is again flashed for 30 seconds to 10 minutes and the total coatings are then baked at temperatures sufficient to drive off all of the solvent in the case of thermoplastic layers and at temperatures sufficient to cure and cross-link in the case of thermosetting layers. These temperatures can range any where from ambient temperature to about 400° F. Typically in the case of thermosetting material temperatures of about 225° F. to about 280° F. (e.g., 250° F.) are used, (e.g., for about 30 minutes).

The following examples are illustrative of the principles and practice of this invention although not limited thereto. Parts and percentages where used are parts and percentages by weight. All coatings were applied with a Ransburg turbobell electrostatic sprayer (3 inch diameter, $\frac{5}{8}$ inch depth) at a traverse speed of 14 ft/min., 12-14 inch standoff, 20,000 rpm, at a voltage of about 110 Kv.

EXAMPLE 1

Bonderized steel panels primed with a cured corrosion resistant primer were sprayed with super jet black base coat paint composition to a film thickness of 0.6 mil on a dry film basis. After a flash of approximately 2 minutes at room temperature an additional 0.6 mil film of the base coat paint composition again as measured on a dry film basis was applied by spraying. After a two-minute flash containing an iron oxide encapsulated mica on one panel and a titanium dioxide encapsulated mica on another panel in 0.001 pigment to binder ratios were applied by spraying to a film thickness on a dry basis of 2 mils. The transparent topcoating composition was prepared by blending 144 parts of the copolymer solution described above at 45 percent nonvolatiles with 58 parts of 60 percent nonvolatile solution of butylated methylol melamine. The thus coated substrates were baked at 250° F. for 30 minutes. In the case of the iron oxide encapsulate mica an additive color shift was produced, not reducing the jetness of the jet black base coat, but adding a soft, lustrous opalescent hue shift in the clear coat. On the titanium dioxide encapsulated mica panel, however, a color reduction of the base coat color took place producing a myriad of color reflections. The total color absorption of the jet black reflected back through the titanium dioxide encapsulated mica producing a complete range of colors as the light waves were twisted and bent upon their exit from the film. The final result was a unique, novel aesthetic effect that is a total product of the visible color spectrum.

EXAMPLE 2

Using the procedures of Example 1, a pure white base coat was similarly overcoated with the iron oxide and titanium dioxide encapsulated mica containing transparent overcoat layers. Utilizing the golden bronze Richelyn TM (Inmont Corporation) iron oxide encapsulated mica produced a gold color, the red Richelyn, a pink color, and the copper Richelyn in orange color. However the titanium dioxide encapsulated mica produced a soft white pearlescent effect retaining the purity of the base coat while adding a subtle shimmer of pearl.

The compositions and processes according to the present invention provide many improvements over the paint compositions and processes of the prior art. Color effects at least equivalent to the use of metallic particles are produced without the need for metal particles and the application and stability problems associated with them. Novel color effects can be produced. Better hiding of surfce defects can be produced. Color, hiding, fineness of particle size and reflectance not available with other pearlescent pigments are produced while maintaining the appealing and desirable soft, lustrous appearance characteristic of pearlescent. Blending with organic and/or inorganic pigments (including metal particles) is possible with enhancement of aesthetic effects produced. Weather durable color effects are produced.

The applied compositions are not moistrue sensitive, use relatively small particle size, are less sensitive to criticality of applications, maintain color trueness at all angles (face to flop color travel), can withstand the elements (i.e., sun exposure), allow low bake repair color matching, and resist settling and chemical (e.g., acid rain) attack.

It should be noted that while the compositions of the present invention are particularly adapted for original equipment manufacture coatings for automobiles, one of their advantages is the low bake matching use as refinish compositions as well. Whereas in original equipment manufcture the disclosed celluose esters and/or wax are typically used, such are not universally required for example in refinish compositons. Also, where the thermosetting polymer embodiments are preferred in the original equipment manufcture, in refinish either low temperature cure thermosetting materials (e.g., 150° to 180° F.) or ambient temperature cure thermosetting or thermoplastic materials are preferred.

A big advantage of the transparent topcoat of the present invention is the extremely low pigment to binder ratio of titanium dioxide encapsulated mica necessary to produce the improved, unique, aesthetic effects and protective qualities of the present invention. Typical pigment to binder ratios range from about 0.0001 to 0.32 (by weight) and preferably about 0.001. The titanium dioxide encapsulated mica particles in the topcoat also provide a multiplicity of prismatic variation both due to the presence of the particles in the topcoat and due to the light reflective and refractive properties of the particles themselves, i.e., the individual layers on the mica particles. This also provides exceptional color control not obtainable with traditional systems or metal flakes.

Another advantage of the system according to the present invention is the durability of the coating. The titanium dioxide encapsulated mica particles are natural ultraviolet light absorbers. This provides protection not only to the polymer base but the organic and inorganic pigments as well. For automobile use this provides extended weathering durability.

The topcoat coating material having a low pigment to binder ratio of titanium dioxide encapsulated mica pigments does not alter the rheology of the clear coating. This allows application over both poor and excellent rheological base coats with excellent aesthetic qualities resulting. This offers enamel systems with improved rheology over traditional enamels. Furthermore, the titanium dioxide encapsulated mica pigments in the clear coat provide a reinforcing mechanism for the clear coat to the base coat resulting in a better anchored coating system.

In the method area the highly critical parameters necessary for various coating procedures such as electrostatic spraying required by the use of metal flakes is no longer a problem with the material of the present invention. In addition, the method of the present invention produces greater pump stability in the lengthy paint lines required in most automotive applications. With metal flakes in the paint not only is pump stability a problem but the shearing effect on the metal flake alters the original color.

The paints according to the present invention all have improved heat stability over conventionally used paint and improved chemical resistance over metal particle-containing paints. Another advantage is the volume to weight ratio of solids in the paints with the elimination of metal particles and as mentioned above the low pigment to binder ratios useable with the present invention.

Although this invention has been shown and described with respect to detailed embodiments thereof, it will be understood by those skilled in the art that various changes in form and detail thereof may be made without departing from the spirit and scope of the claimed invention.

I claim:

1. A substrate material coated with at least two layers of polymer including a base coat comprising a pigmented thermosetting or thermoplastic resin and a transparent topcoat on the base coat, wherein the transparent topcoat consists essentially of a thermoplastic or thermosetting resin containing titanium dioxide encapsulated mica particles in a particle to resin weight ratio of about 0.0001 to about 0.32, the mica particles being about 5 microns to about 150 microns nominal longitudinal dimension and having a thickness of about 0.25 micron to about 1 micron, the titanium dioxide encapsulation representing about 10% to about 85% by weight of the total weight of the particle.

2. The article of claim 1 wherein the substrate is metal, and the titanium dioxide encapsulation layer is overcoated with a layer containing about 0.1% to about 3.5% chromium hydroxide based on total weight of the particle.

3. The article of claim 2 wherein the mica particles are about 5 microns to about 75 microns nominal longitudinal dimension.

4. A method of coating a substrate with multiple layers of polymer comprising applying at least one layer of a base coat of pigmented thermosetting or thermoplastic resin to the substrate, applying at least one layer of a transparent thermosetting or thermoplastic topcoat on the base coat, and drying or curing the applied coatings, the transparent topcoat consisting essentially of a thermoplastic or thermosetting resin containing titanium dioxide encapsulated mica particles in a particle to resin weight ratio of about 0.0001 to about 0.32, the mica particles being about 5 microns to about 150 microns nominal longitudinal dimension and having a thickness of about 0.25 micron to about 1 micron, the iron oxide encapsulation representing about 10% to about 85% by weight of the total weight of the particle.

5. The method of claim 4 wherein the substrate is metal and the titanium dioxide encapsulation layer is overcoated with a layer containing about 0.1% to about 3.5% chromium hydroxide based on the total weight of the particle.

6. The method of claim 5 wherein the micron particles are about 5 microns to about 75 microns nominal longitudinal dimension.

7. The method of claim 5 wherein the micron particles are about 5 microns to about 40 microns nominal longitudinal dimension.

* * * * *